United States Patent [19]

Laakman et al.

[11] Patent Number: 4,493,087
[45] Date of Patent: Jan. 8, 1985

[54] RF EXCITED WAVEGUIDE GAS LASER

[75] Inventors: Katherine D. Laakman; Peter Laakmann, both of Laguna Niguel, Calif.

[73] Assignee: Walwel, Inc., San Juan Capistrano, Calif.

[21] Appl. No.: 382,529

[22] Filed: May 27, 1982

Related U.S. Application Data

[63] Continuation of Ser. No. 103,162, Dec. 13, 1979, abandoned, which is a continuation-in-part of Ser. No. 78,343, Sep. 24, 1979, Pat. No. 4,373,202.

[51] Int. Cl.³ ............................................. H01S 3/03
[52] U.S. Cl. ..................................... 372/64; 372/81; 372/87; 372/82; 372/38
[58] Field of Search ............................ 372/81, 55, 87; 350/96.14, 355; 378/64, 88, 61; 322/38

[56] References Cited

U.S. PATENT DOCUMENTS 4,088,965 5/1978 Lauderstager et al. ............... 378/81
4,169,251 9/1979 Laakmann ............................ 378/81

FOREIGN PATENT DOCUMENTS 0136680 7/1979 German Democratic Rep. ... 372/81

Primary Examiner—William L. Sikes
Assistant Examiner—Léon Scott
Attorney, Agent, or Firm—Michael A. Kaufman

[57] ABSTRACT

A waveguide gas laser of improved stability and efficiency resulting from novel improvements. Such improvements, including longitudinal RF excitation, unique ballasting techniques, a novel drive circuit design that is immediately responsive to defeat unstable hot spot problems, and a controlled power excitation function, result in an RF excited waveguide gas laser that substantially overcomes disadvantages of prior art devices.

In one embodiment the invention consists of a longitudinally excited RF waveguide laser in which the spacing geometry of the electrodes is variable independently of the waveguide chamber geometry resulting in increased performance efficiency. In addition, hot spot problems are eliminated or substantially reduced by capacitive ballasting achieved through novel structural configurations including electrodes that are isolated from the waveguide chamber by means of a suitable dielectric spacing medium such as ceramic or aluminum oxide. In addition, a novel drive circuit of quarter-wave length and 75 Ohm characteristic impedance is utilized and the RF excitation power is applied over a controlled minimum time period of 1 millisecond. In another embodiment a unique homogeneous construction permits the use of a laser head configuration in which the waveguide is located within an RF shielding container, the interior of which, is at ambient pressure and which provides an enclosed channel for forced air cooling of the waveguide.

In still another embodiment, the waveguide chamber or laser bore is formed by opposing aluminum electrodes sandwiched between two alumina blocks. The assembly is held in alignment and compression by an elastic tube that serves as a spring-like vacuum housing, and heat sink while positioning the waveguide and optical elements in proper alignment.

1 Claim, 19 Drawing Figures

DIRECTION OF ELECTRIC FIELD IN WAVEGUIDE CHAMBER

DIRECTION OF ELECTRIC FIELD IN WAVEGUIDE CHAMBER $$\frac{\partial C_1}{\partial x} = \frac{w\epsilon}{d}$$

$$\frac{\partial C_2}{\partial x} = \frac{w\epsilon}{a}$$

$$Cb \approx \frac{ds\,\epsilon}{4t}$$

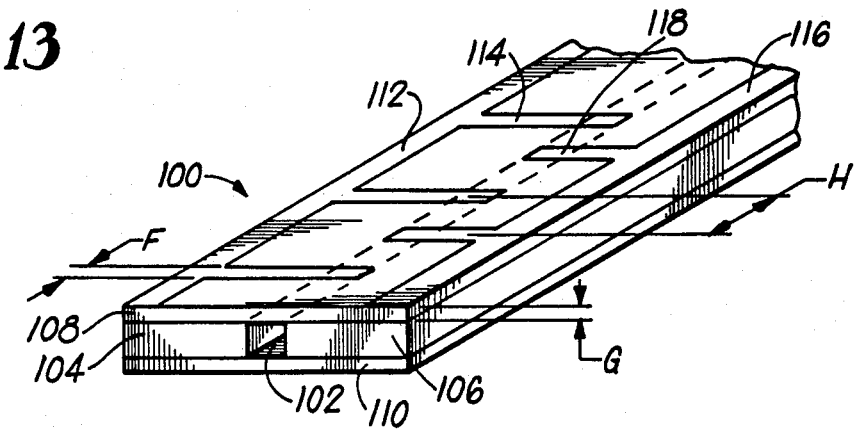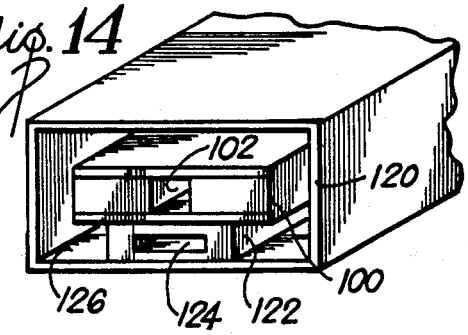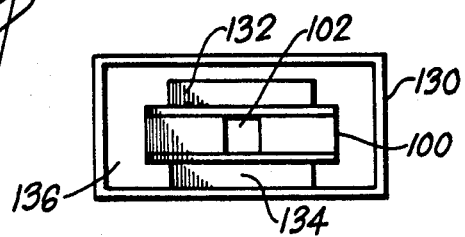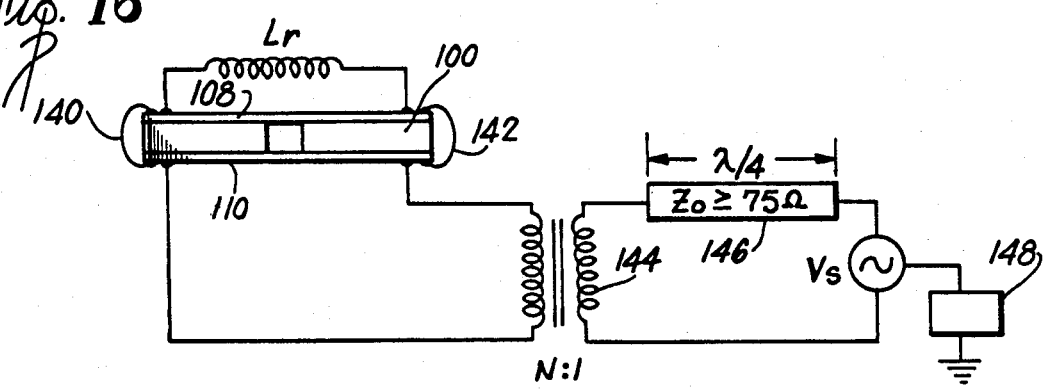

RF EXCITED WAVEGUIDE GAS LASER

CROSS-REFERENCE TO RELATED APPLICATION

This is a continuation of application Ser. No. 103,162, filed Dec. 13, 1979, now abandoned, which in turn is a continuation-in-part of application Ser. No. 078,343, filed Sept. 24, 1979, and now U.S. Pat. No. 4,373,202.

BACKGROUND OF THE INVENTION

1. Field of the Invention

This invention relates to lasers, and more particularly to an improved waveguide gas laser.

2. Prior Art

In a U.S. patent application entitled "WAVEGUIDE GAS LASER WITH HIGH FREQUENCY TRANSVERSE DISCHARGE EXCITATION", Ser. No. 869,542, filed for the inventor Katherine D. Laakmann on Jan. 16, 1978, and now U.S. Pat. No. 4,169,251 one applicant of the present invention disclosed a waveguide laser excited by means of a transverse discharge at RF frequencies in the range of about 30 Mhz to about 3 Ghz and in which a laser gas is disposed in an elongated chamber and discharge is established in the gas by means of an alternating electrical field applied to the chamber along a direction transverse to its length. The superior performance of that RF frequency transverse excited waveguide laser, as well as its reduced size and complexity in comparison to existing prior art such as that disclosed in U.S. Pat. Nos. 3,772,611 and 3,815,047, are specifically delineated in that patent application and need not be reviewed herein.

The present invention is also directed to a waveguide laser with high frequency excitation, but which provides certain substantial and novel improvements over applicant's prior invention. As a result, the present invention provides the many advantages of radio frequency transverse excitation waveguide lasers as disclosed in the aforementioned prior application, but in addition overcomes the difficulties and limitations of the aforementioned prior invention and thus provides a far more versatile and efficient laser device. One such improvement is the utilization of longitudinal excitation which renders the selection of waveguide bore size and electrode separation independent parameters and thus permits optimization of radio frequency selection independently of bore size.

An additional improvement of the current invention over the previously disclosed RF excited gas waveguide laser comprises a novel means for eliminating a serious and limiting disadvantage of the previously disclosed device, namely, the formation of non-uniformities or "hot spots" apparently resulting from the bistable discharge impedance characteristics. Such hot spots tend to decrease the gain, efficiency, and output power of the laser. To overcome this disadvantage of the prior art device, the present invention utilizes a combination of structural and circuit improvements including the use of series capacitive ballasting resulting in novel improvements in the waveguide structure. Additional improvement is achieved by means of a unique drive circuit that is used to sense the occurrence of low impedance hot spots and to adjust input power accordingly to minimize the otherwise non-uniform negative impedance characteristics.

Still an additional improvement is the use of a totally homogeneous structure which while furthering the remedy for the hot spot problem referred to above, results in a waveguide laser that is more compact, more stable with respect to gas chemistry and more reliable than would result merely from the teachings of applicant's prior invention related to a transverse RF excited waveguide laser.

Accordingly, the present invention has all of the advantages provided by applicant's prior device, namely, the high frequency transverse excitation waveguide laser, but in addition, the present invention overcomes the difficulties and limitations of the high frequency transverse excitation technique. The principal advantage of the longitudinal RF excitation over transverse RF excitation resides in the resulting independence in selection of active bore size of the laser chamber and electrode separation distance for the excitation means. Alternatively, the advantage resides in the opportunity to optimize the RF drive frequency independently of the bore size.

It is taught in the applicant's prior patent application that efficient lasers with RF excitation require an RF drive frequency to be sufficiently high so that electrons drift only a negligible distance in relation to the electrode gap separation during one half cycle of the alternating electric field. Otherwise, spacer-charge regions build up in the vicinity of the electrodes which results in higher electric field across the electrode gap and hence higher electron temperatures. It is also well known that in molecular gas laser physics the optimum electron temperature for maximizing laser head efficiency tends to be considerably lower than the electron temperature in self-sustained discharges. Furthermore, high electron temperatures lead to greater $CO_2$ dissociation rates which lead to lower tube life. Therefore, in self-sustained discharges it is desirable to minimize the electron temperature and therefore, also minimize the electron field intensity required to sustain the discharge. Accordingly, for RF discharges there is a minimum RF drive frequency for maximizing laser head efficiency for a given electrode gap separation.

In a transverse RF excitation waveguide laser of the prior art, the laser bore size and electrode gas separation are inherently the same. Accordingly, the bore size dictates the minimum RF drive frequency and as the RF drive frequency is increased the coupling efficiency between the RF energy source and the discharge decreases and it becomes increasingly difficult to obtain efficient RF drive sources. Thus the overall laser efficiency for the transverse RF discharge of the prior art device suffers due to low laser head efficiency if the RF drive frequency is below the desirable minimum. On the other hand, if the RF drive frequency is too high the efficiency suffers because of the lowering in coupling efficiency between the RF source and the discharge.

The above-identified upper and lower RF frequency limitations become particularly problematical when the bore size is small and therefore requires a relatively high RF drive frequency in terms of laser head efficiency. Unfortunately, such high RF drive frequency results in lower coupling and power supply efficiency; a paradoxical situation. However, with the longitudinal RF excitation of the present invention and the resulting independence between electrode gas separation and bore size, it is now possible for the first time to choose the RF drive frequency for high coupling and power supply efficiency and then separately choose the electrode gap separation for optimum laser head efficiency.

SUMMARY OF THE INVENTION

Accordingly, the present invention, by means of longitudinal RF excitation, provides a waveguide laser device having higher overall efficiency than waveguide lasers utilizing applicant's prior invention, namely, transverse RF excitation. Furthermore, the degree of improvement in efficiency resulting from longitudinal versus transverse RF excitation, increases and thus creates substantial additional advantage for higher RF drive frequencies which would otherwise be required for smaller bore devices utilizing the transverse excitation configuration.

The present invention, utilizing longitudinal excitation, provides additional overall efficiency improvement as compared to transverse excitation either because the electrode separation is larger or because the electrode area is smaller than the corresponding electrodes for the transverse excitation device. As a result, the capacitance in the resulting waveguide structure is lowered and this results in a lower loaded "Q" of the waveguide structure. Loaded "Q" is defined as the "Q" during discharge ignition. A lower loaded "Q" results in greater coupling efficiency because of reduced circulating power and reduced power dissipation in other circuit elements. Also, the allowance of a lower RF drive frequency for a given bore size, further reduces circulating power while still maintaining the same laser head efficiency resulting in still higher overall efficiency.

Typical construction of the prior art transverse discharge waveguide laser includes a transverse discharge section coupled from a 50 Ohm transmission line circuit and matched by a resonant pi-circuit. The disclosed structure uses a transformer with a shunt inductor across the discharge setting to tune out the reactance. The discharge section is used in a balanced mode. The transformer/shunt inductor structure allows tight coupling of the RF drive to the discharge as well as independent adjustment of impedance matching with respect to reactance tuning. The disclosed balanced structure of the present invention minimizes stored charge with the voltage to ground at each electrode equal to one half the total gap voltage.

In various embodiments of the present invention, a number of novel improvements are included to preclude or reduce hot spot problems that would otherwise severely decrease the performance of the waveguide laser. In one embodiment such improvement consists of a novel and inventive modification in the basic construction of the laser. Transversely excited RF lasers are, typically, fabricated by means of a conventional sandwich construction consisting of two metal strips sandwiched between two alumina blocks. The waveguide bore formed between the metal strips and the alumina blocks, is typically 1-3 millimeters square. This construction produces on the order of one half watt per inch of laser length in a $CO_2$ waveguide laser.

As the laser length is increased the point is reached at approximately eight inches in length and at about 5 to 10 watts per inch in power loading where the laser discharge becomes bistable and the aforementioned localized discharge hot spots develop. It has been experimentally determined that bare aluminum electrodes are a preferred material because this material is more resistant to sputtering than most common material. However, a problem associated with the use of a bare aluminum electrode is the process of electrode oxidation which is quite severe and affects the long term gas chemistry stability. The oxidation problem has been solved in the present invention by means of a hard anodizing coating on the aluminum electrodes. This aluminum oxide coating forms an insulating layer on the metal. In order to also solve the hot spot problems referred to above, particularly at higher power loading, applicants have also discovered a means of providing a structural dielectric ballast for the longitudinally excited RF waveguide laser. This structure consists of two alumina strips 1 to 3 millimeters thick sandwiched between two sheets of alumina. The waveguide bore formed thereby is 1 to 3 millimeters square and the alumina sheets are between ½ to 2 millimeters thick. The electrodes are external to the discharge waveguide structure. The resulting structure is totally homogeneous aluminum oxide and can therefore be solder sealed and the gas then confined to the bore only. This contrasts with the prior art transverse excitation laser which is placed in its entirely, into a gas filled cavity. A further advantage of the present invention is that the electrodes are completely insulated from the discharge and therefore do not degrade with time as quickly as electrodes in prior art devices.

In another embodiment of the present invention the tendency of prior art devices to develop localized hot spots has been further reduced by a novel drive circuit design. When a waveguide excited discharge laser section is properly excited, the impedance characteristic is positive and the discharge is uniform throughout the length of the device. In this mode, with its reactance tuned out, the discharge impedance appears resistive and is matched to 50 Ohms through a tightly coupled ferrite transformer. When the discharge develops hot spots, measurements have shown that the total voltage and discharge impedance decrease about 20 to 40 percent. In an embodiment of the present invention, applicants have provided a drive circuit designed to instantaneously reduce the input power when a lowering of impedance is sensed. As a result, the discharge section cannot operate in a unstable or hot spot mode and the result is continuous proper excitation of the discharge.

In one embodiment such a drive circuit consists of a quarter-wave transmission line of higher impedance than the 50 Ohm laser head matched impedance. By way of example, a quarter-wave section of 75 Ohm cable may be selected as a proper drive circuit because a quarter-wave section has the characteristic of converting impedance changes around its characteristic value. If a 75 Ohm load is applied to the section, a real impedance of 75 Ohms is seen at the cable input. If a 50 Ohm load is applied at one end, a real impedance of 112½ Ohms exists at the other end. Alternatively, if the load drops to 25 Ohms, which is typical of the hot spot mode, the input impedance rises to 225 Ohms. If such a quarter-wave section is used between a 50 Ohm laser head and a source which is matched to 50 Ohms for maximum power, the delivered power would drop almost instantaneously leading to the extinguishing of the hot spot mode.

In still another embodiment of the present invention, an improved laser head structure is employed in which the laser bore is formed by opposing aluminum electrodes sandwiched between two alumina blocks. This assembly is held in alignment and compression by an elastic tube that serves as a spring-type evacuatable housing and heat sink that positions the waveguide and optical components in proper alignment.

OBJECTS OF THE INVENTION

It is thus a primary object of the present invention to provide an improved radio frequency excited waveguide laser device which substantially decreases or entirely overcomes certain disadvantages of prior art RF excited waveguide lasers, but which still provides the numerous advantages of such waveguide laser devices over more conventionally excited waveguide lasers.

It is an additional object of the present invention to provide a waveguide laser with high frequency longitudinal excitation to permit selection of waveguide bore size independently of the selection of the RF frequency of the excitation signal and thus permit selection of parameters for a more efficient laser device.

It is still an additional object of the present invention to provide a waveguide laser utilizing high frequency excitation, and in which ballasting provides a means of substantially reducing or eliminating hot spot problems resulting from unstable discharge caused by operating in bistable impedance regions.

It is still an additional object of the present invention to provide a novel structure for a high frequency excited waveguide laser device which structure results in an extended life, reduction in size and more reliable and efficient operation as compared to prior art high frequency excited waveguide lasers.

It is still an additional object of the present invention to provide a drive circuit to match an RF source with a laser head to automatically reduce input RF power upon the sensing of the occurrence of low impedance due to instability in hot spot mode operation that would otherwise occur at constant higher power levels.

It is still an additional object of the present invention to provide a novel housing for a waveguide assembly which provides for low cost mass production of waveguide laser structures and which provides for alignment and compression of the waveguide assembly by an elastic tube that serves as a spring-like evacuatable housing and heat sink that positions the waveguide and optical elements in proper alignment.

The above objects and advantages of the present invention and numerous additional objects and advantages will become apparent to those having skill in the relevant art as a result of applicant's further detailed description of the preferred embodiment of their invention taken in conjunction with the accompanying drawings in which:

BRIEF DESCRIPTION OF THE DRAWINGS

FIG. 13 is a three dimensional view of a preferred embodiment of a longitudinal excitation waveguide gas laser of the present invention;

FIGS. 14 and 15 are examples of two alternate embodiments of laser head configurations embodying the waveguide of FIG. 13;

FIG. 16 is an electrical circuit drawing illustrating the manner in which the waveguide of FIG. 13 is connected to a suitable drive circuit and RF voltage source for laser excitation.

DETAILED DESCRIPTION OF THE INVENTION

In the following detailed disclosure of the present invention including various embodiments thereof, it will be apparent that the invention comprises improvements to waveguide gas lasers including the novel implementation of an alternative form of radio frequency energy excitation hereinafter referred to as longitudinal excitation. A number of additional improvements applicable to both transverse and longitudinal excitation waveguide gas lasers are also disclosed. These additional improvements are designed to still further enhance performance and overcome a bistable impedance characteristic common to both forms of excitation waveguide gas lasers as will hereinafter be disclosed in more detail.

Figure 1:
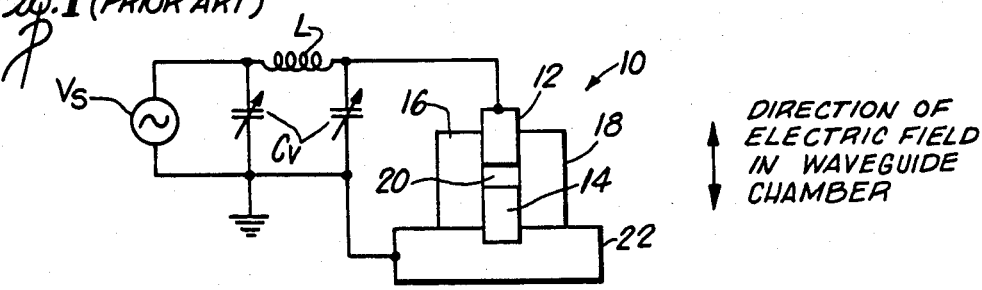
FIG. 1 is a cross-sectional view in partial schematic form illustrating a transverse discharge waveguide gas laser of the prior art.

In order to convey a more complete understanding of the novel improvements in the waveguide gas laser technology, it is believed preferable to briefly review the prior art represented by the transverse discharge waveguide laser of applicant's aforementioned prior patent application. In particular, FIG. 1 is a drawing illustrating the basic configuration of a prior art transverse discharge waveguide gas laser according to applicant's prior invention in which the waveguide laser 10 comprises a pair of opposing elongated electrically conductive electrode members 12 and 14 interposed between a pair of opposing elongated dielectric members 16 and 18 in a manner defining an elongated chamber 20 wherein a laser-exciting discharge is to be generated. Chamber 20 may, for purposes of illustration, have a length of about 20 centimeters and have a square cross-section with sides of 2 millimeters in length. Electrode members 12 and 14 are of metal such as aluminum while dielectric members 16 and 18 may be of a material such as beryllium oxide, aluminum oxide, or glass. The waveguide structure may rest on a block 22 made of a material of a high thermal conductivity such as copper to remove heat from the waveguide assembly during operation. The dischage chamber 20 is filled with a desired laser gas such as a standard $CO_2$ laser gas mixture.

An RF power source $V_s$ is coupled between electrode members 12 and 14 to provide the appropriate discharge excitation which establishes an electric discharge in the laser gas sufficient to invert the population of the energy levels of the desired laser transistion. A pi- type coupling circuit comprising adjustable capacitors $C_v$ and inductor "L", functions as an impedance matching network to cancel the reactive impedance of the discharge chamber-defining structure and to match the real value of the input impedance which is typically about 50 Ohms.

One important distinction between an embodiment of the present invention as compared to the prior art device illustrated in FIG. 1, is that the electric field developed across the chamber 20 for discharge purposes is in a vertical direction between electrodes 12 and 14 and thus transverse to the longitudinal axis of chamber 20. It will be clear that the electrode separation distance is inherently the same as the chamber vertical gap separation. Thus, waveguide bore size dictates the minimum RF drive frequency and the aforementioned limitations on overall laser efficiency result.

Figure 3:
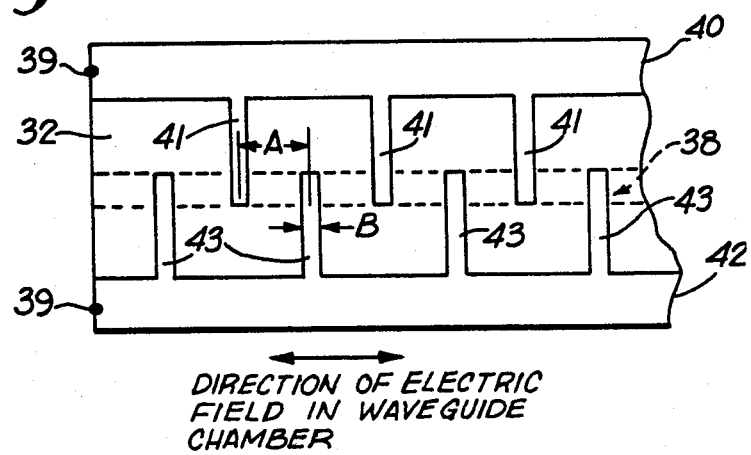
FIG. 3 is a cross-sectional top view of the electrode configuration of the waveguide gas laser taken along line 3—3 of FIG. 2.
Figure 4:
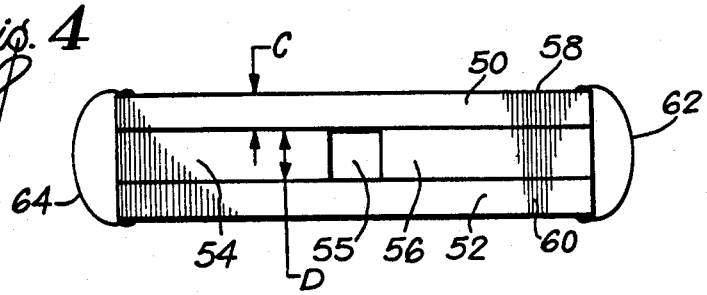
FIG. 4 is a front view of a homogeneous embodiment of the longitudinal discharge configuration of the invention.

In the present invention, applicants have discovered a means by which the electric field excitation is applied parallel to the longitudinal axis of the waveguide bore. A particular embodiment implementing longitudinal excitation is illustrated in FIGS. 2 and 3, and a preferred embodiment of the longitudinal structure of the present invention is illustrated in FIG. 4.

Figure 2:
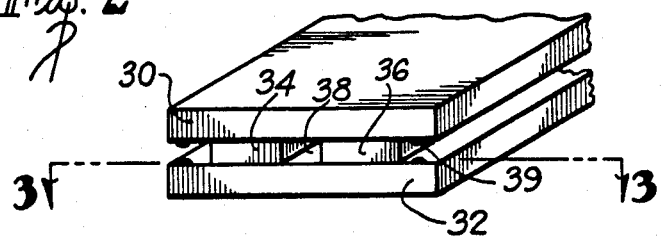
FIG. 2 is an isometric drawing of one embodiment of a longitudinal discharge excitation arrangement for waveguide gas lasers.

As shown in FIG. 2, the laser configuration of the present invention comprises a pair of ceramic blocks 30 and 32 substantially prallel to one another and separated from each other by a pair of dielectric blocks 34 and 36 which are, in turn, spaced from each other to form a waveguide bore 38 which constitutes the discharge region of the waveguide laser.

The electrodes for the waveguide laser in embodiment illustrated in FIG. 2, are on the respective inside surfaces of ceramic blocks 30 and 32, that is, the surfaces that are contiguous to the dielectric blocks 34 and 36, which define waveguide bore or chamber 38. The electrode configuration is illustrated best in FIG. 3 which illustrates the inside surface of ceramic block 32. As shown in FIG. 3, there is an electrode 40 of first polarity and an electrode 42 of second polarity. Electrodes 40 and 42 are located along the edge of ceramic block 32 running substantially parallel to waveguide bore 38. Each electrode has a series of generally perpendicular portions 41 and 43, respectively, which lie transversely across the waveguide chamber 38 in an overlapping configuration.

It will be understood that there is another pair of electrodes of identical configuration on the corresponding inside surface of upper ceramic block 30. Electrodes 40 and 42 are each provided with a solder bead 39 to permit electrical interconnection as will be hereinafter described. More specifically, electrode 40 is electrically connected to the corresponding electrode immediately above and parallel to it along the surface of upper ceramic block 30. Similarly, electrode 42 is electrically connected to the corresponding electrode immediately above and parallel to it, also on upper ceramic block 30. Electrodes 40 and 42 and the corresponding electrodes on upper ceramic block 30 to which they are connected, respectively, are electrically connected to the opposite phase junctions of a radio frequency voltage source, such as $V_s$ shown schematically in prior art FIG. 1, through an appropriate drive circuit to be described below. As a result of the aforementioned electrical connection and geometry of the electrodes of the present invention, a radio frequency electric field is induced in a direction parallel to the longitudinal axis of chamber 38, the inside walls of which are positioned relative to the electrodes as illustrated by the dotted lines in FIG. 3.

The spacing "A" between the center lines of the perpendicular overlapping portions 41 and 43 of the electrodes 40 and 42 can be varied as a function of RF frequency of the applied source, and as previously indicated is varied independently of the dimensions of the waveguide bore or chamber 38 as distinguished over the prior art configuration of FIG. 1. Typical operation of the present invention occurs with dimension "A" being in the range of approximately 0.2 inches to 0.5 inches with a corresponding voltage differential of between approximately 500 volts and 1000 volts. It is contemplated that the electrodes would be affixed to the surface of the ceramic blocks by a metalization process such as sputtering. However, any one of a number of well known processes for depositing a thin film of metal of high conductivity on a ceramic substrate would be suitable for implementing the present invention. Dimension "B", corresponding to the typical width of portions 41 and 43, is about 0.02 inches.

FIG. 4 illustrates a preferred embodiment of the longitudinal excitation waveguide gas laser of the present invention. The preferred configuration of the invention illustrated in FIG. 4 provided a number of additioned advantages over the prior art waveguide lasers as will be hereinafter more fully understood. It has been experimentally extablished that a bare aluminum electrode represents one of the preferred selections for the electrode material since aluminum appears to be more resistant to the effects of the laser discharge. However, as the laser length is increased a point is reached at about 8 inches, with power loading in the vicinity of 5 to 10 watts per inch, where the laser discharge displays a bistable impedance characteristic which results in the previously described hot spot problem. In addition, the aluminum electrodes oxidize rapidly and severe oxidation occurring after only several hours of operation becomes severe enough to reduce the wall conductivity and effect degradation of laser performance. Severe oxidation is probably caused by acid vapor formed in the discharge. The novel configuration of the present invention illustrated in FIG. 4, solves the electrode oxidation problem, tends to reduce the hot spot problem, and in addition provides extremely advantageous structural improvements which result in a more compact and more reliable laser device.

More specifically in the configuration of FIG. 4, the longitudinal waveguide gas laser comprises a pair of alumina sheets 50 and 52 between which are sandwiched two alumina strips 54 and 56 defining waveguide chamber 55. In addition, thin film metalization is applied to the alumina substrates to form the excitation electrodes on the outside surfaces 58 and 60 of sheets 50 and 52, respectively. Clearly, surfaces 58 and 60 are isolated from the discharge chamber 55 of the waveguide. The electrodes on the opposite sides of the waveguide structure are interconnected by means of electrical conductors 62 and 64 which also provide electrical access to a drive circuit. Typically, alumina strips 50 and 52 are 0.5 to 2 millimeters thick measured along the dimension "C" and the alumina strips 54 and 56 are typically 1 to 3 millimeters thick measured along dimension "D". Bore or chamber 55 is typically square in cross-section with 1 to 3 millimeter sides.

The structure of the embodiment of FIG. 4 is totally homogeneous in that all interfacing surfaces, as well as all surfaces comprising the walls of chamber 55, are alumina, that is, $Al_2O_3$ resulting from the hard anodization of aluminum. This structure can be solder sealed so that only chamber 55 need be filled with gas for laser operation. This contrasts with the prior art laser configuration of FIG. 1 which, because of the difficulty in sealing dissimilar materials which form the respective sides of chamber 20 of the prior art transverse excitation waveguide gas laser of FIG. 1, requires that the entire structure be placed into a gas filled cavity or housing which increases the size of the overall structure. Consequently, in the present invention the structure is more compact and because the electrodes are isolated from the gas discharge, the laser is more reliable and durable than the devices of the prior art.

The aforementioned bistable impedance problem tends to occur and diminish the performance of gas waveguide lasers irrespective of whether they are longitudinal or transverse in electrode configuration. Consequently, the additional improvements described hereinafter which pertain to means for elminating or substantially reducing the difficulties in performance and efficiency resulting from the aforementioned bistable impedance problem, are applicable to waveguide gas lasers of either transverse or longitudinal electrode configurations. More specifically, applicants have discovered that by means of capacitive ballasting, a novel drive circuit, and a unique controlled turn-on procedure, either individually or in combination, bistable impedance problems may be avoided.

Figure 5:
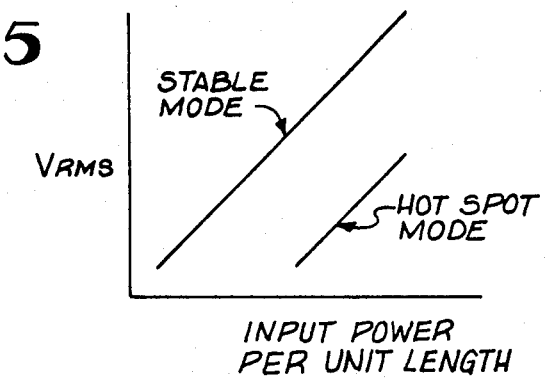
FIG. 5 is a graphical illustration of the bistable impedance characteristic that causes certain problems in both transverse and longitudinal excitation waveguide gas lasers, but that are overcome or substantially reduced by the present invention.

The cause of the aforementioned hot spot problem is represented by the graphical drawing of FIG. 5 which illustrates the limited range of input power over which it has been found that the RF excited discharge is stable and spacially uniform. At sufficiently low input powers the discharge has been seen to "break up". In the case of the prior art transverse discharge waveguide gas laser, during unstable operation the discharge is ignited only along limited portions of the length of the waveguide, and the length of the discharge as well as the location of the discharge, appear to be random. A similar effect is seen to occur for the longitudinal waveguide gas laser of the present invention wherein not all the discharge segments unite to form a continuous stable laser discharge and the various discharge segments appear to ignite and extinguish at random. At higher input power the same type of non-uniformity in both the transverse and longitudinal devices are observed.

It is believed that the instabilities occurring at both ends of the power range, result from a bistable discharge impedance characteristic. The effects of such a bistable impedance characteristic can be mitigated by using a higher RF drive frequency or a larger bore size or by impedance ballasting. Stablization of the discharge by means of ballasting is believed to be the most desireable because it does not affect the versatility of the waveguide in terms of RF frequency or bore size. The preferred solution therefore is ballasting, that is, adding a series impedance which tends to minimize the effect of impedance change in the waveguide discharge as a function of input power. It's best to use a series ballast capacitor as compared, for example, to a series ballast resistor, because no power is dissipated in the ballast element. In addition, a series capacitor is readily implemented in waveguide structures as shown hereinafter in conjunction with FIGS. 6 through 10.

Figure 6:
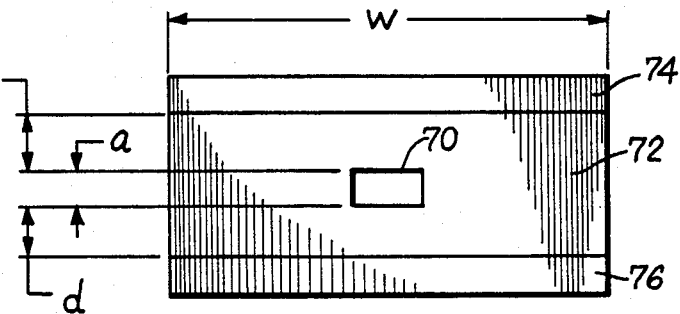
FIG. 6 is a cross-sectional end view of a transverse discharge waveguide gas laser in which capacitive ballasting of the present invention is utilized to overcome the aforementioned bistable impedance problem.
Figure 7:
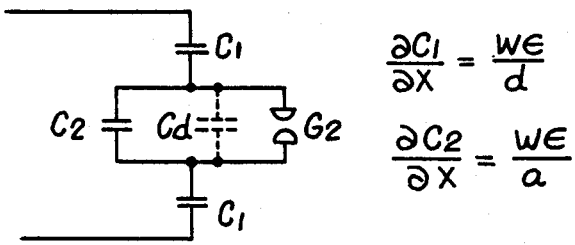
FIG. 7 is a schematic drawing of the equivalent circuit of FIG. 6.

In the case of the transverse discharge configuration of the prior art, capacitive ballasting is implemented as shown in FIG. 6 in which the waveguide bore or chamber 70 is displaced from the center of the ceramic block 72 separating the two electrodes 74 and 76. In the example illustrated in FIG. 6 a waveguide bore of height "a" is displaced from both electrodes by ceramic blocks of dielectric constant $\epsilon$ by a distance "d". The equivalent circuit is illustrated in FIG. 7 in which it is seen that the equivalent impedance of the discharge, represented by the parallel relationship of discharge capacitance C2 and discharge conductance G2, is in series with ballast capacitor C1. As shown by the partial differential equations of FIG. 7, the variation with waveguide length "X" of the respective capacitance may be defined as the width of the cross-section of the waveguide structure "W" multiplied by the dielectric constant $\epsilon$ and divided by the distance "d". The variation of the discharge capacitance C2 with respect to waveguide length may be similarly defined as the width "W" multiplied by the dielectric constant $\epsilon$ and divided by the height of the waveguide bore "a". It is thus clear that by varying the dimension "d" with respect to the dimension "a", it is possible to insert a stable large capacitance in series with the discharge capacitor resulting in a more stablized impedance characteristic that avoids or substantially reduces the likelihood of unstable hot spots occurring in the discharge for any length waveguide laser of transverse excitation.

Figure 8:
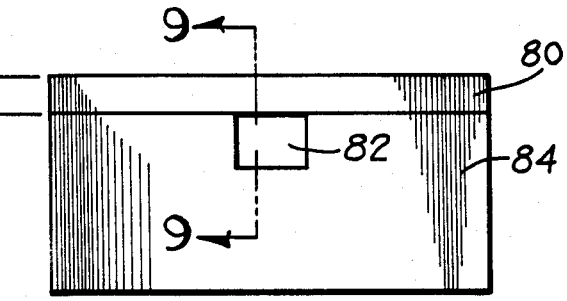
FIG. 8 is a cross-sectional end view of a longitudinal discharge excitation waveguide gas laser also employing capacitive ballasting.
Figure 9:
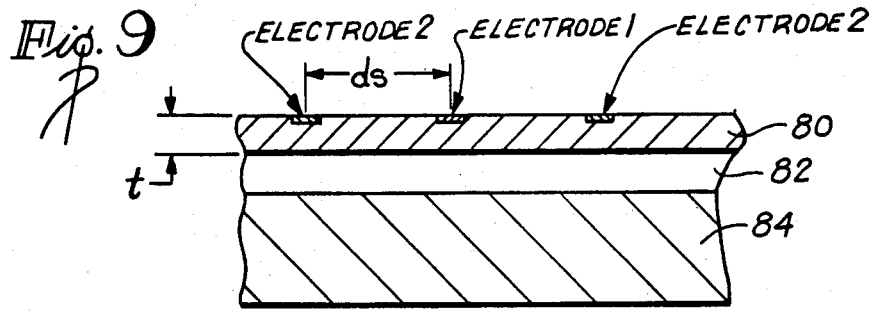
FIG. 9 is an additional drawing of the longitudinal waveguide gas laser employing capacitive ballasting but with a view of the side of the waveguide to better illustrate the structure thereof.

FIG. 8 and FIG. 9 illustrate an analogous form of capacitive ballasting for the longitudinal excitation waveguide gas laser in an embodiment in which at least one set of electrodes is displaced from the waveguide chamber by a thickness "t" of dielectric material such as a ceramic or aluminum oxide. The overlapping electrode portions, corresponding to portions 41 and 43 respectively of FIG. 3, are, as indicated in FIG. 9, displaced from each other by a distance "ds" and in turn displaced vertically from the chamber 82 by a thickness of dielectric 80.

Figure 10:
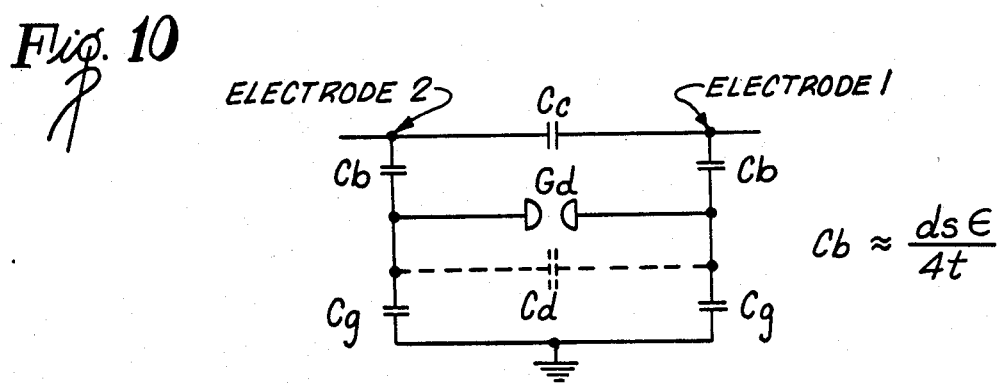
FIG. 10 is a schematic drawing of the circuit equivalent of the capacitive ballasted longitudinal excitation gas waveguide laser of FIGS. 8 and 9.

FIG. 10 is an equivalent circuit illustrating the various capacitances for the waveguide configuration of FIGS. 8 and 9 in which it is assumed that the lower dielectric block 84 is connected to electrical ground by, for example, being situated on a ground plane. The displacement of the electrodes from the chamber wall by the dielectric 80 over a thickness "t" adds ballast capacitance $C_b$ between the discharge capacitance $C_d$ and each electrode. In addition there is a capacitance between each side of the discharge and the ground through the lower dielectric block 84. As indicated in FIG. 10, the value of the ballast capacitance $C_b$ between each electrode and the discharge conductance $G_d$ is approximately equal to the spacing between the electrodes, "ds", multiplied by the dielectric constant ε of the dielectric block 80, are divided by four times the thickness "t" of the dielectric block 80. It will now be understood that the unique position of the electrodes, that is, on the upper surface of the waveguide structure spaced by a dielectric medium from the waveguide chamber, is doubly advantageous in that in addition to isolating the electrodes from the otherwise degrading effects caused by direct contact with the discharge within the waveguide chamber, it also provides ballasting capacitance which minimize the effects of the bistable impedance characteristic of the discharge.

Figure 11:
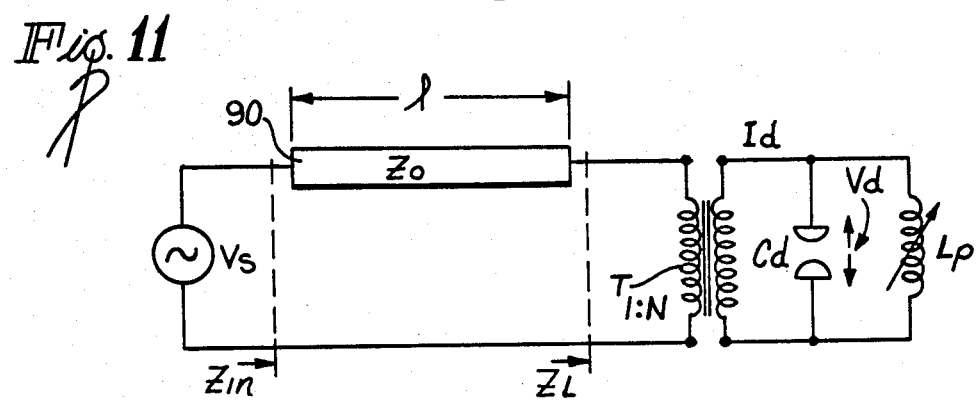
FIG. 11 is a schematic circuit drawing used to explain a novel drive circuit according to one embodiment of the present invention.
Figure 12:
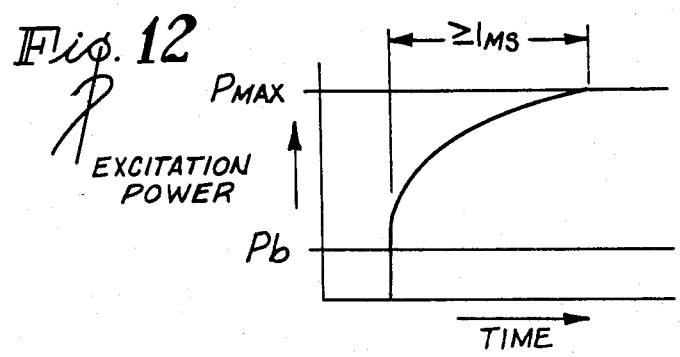
FIG. 12 is a graphical illustration of a power excitation versus time characteristic that is employed in one embodiment of the present invention to further reduce the liklihood of detrimental effects of the bistable impedance characteristic illustrated in FIG. 5.

Reference will now be had to FIGS. 11 and 12 for explanation of still an additional means for overcoming or substantially reducing the detrimental effects of the bistable impedance characteristic referred to previously.

In FIG. 11 the discharge capacitance $C_d$ is connected to a voltage generator $V_s$ through a coaxial line 90 having a predetermined length "l", expressed in terms of wavelength, and having a characteristic impedance $Z_o$, and by a transformer "T" with a turns ratio "N". In addition, a tunable coil $L_P$ is connected in parallel with the discharge capacitance and adjusted to resonate out that capacitance for the frequency of excitation.

When coax 90 is a quarter-wave line, the input voltage and current are given by:

$$V_{in} = jZ_o I_o$$
$$I_{in} = jZ_o^{-1} V_o \tag{1}$$

where $I_o = I_d N$ and $V_o = V_d/N$ and $I_d$ and $V_d$ are the discharge current and voltage (assuming resonance).

We can relate $V_{in}$ and $I_{in}$ by:

$$V_{in} = V_s - R_s I_{in} \tag{2}$$

Substituting in $V_d$ and $I_d$ leaves:

$$-jV_s = Z_o N I_d + (R_s/N Z_o) V_d \tag{3}$$

This equation is the equation of a load line. The only significance of the 'j' is that the discharge current and voltage are 90° out-of-phase with respect to the source. The effective source impedance is therefore:

$$(R_s)\text{eff} = (Z_o^2 N^2/R_s) \tag{4}$$

Stability is obtained by insuring $$\partial V_d/\partial I_d + (R_s)\text{eff} > 0 \text{ (because net impedance is positive)} \tag{5}$$

Hence, by using a characteristic impedance much larger than the source impedance, the effective source impedance can be increased dramatically. This allows condition of equation (5) to be met.

An alternative way at looking at this is to think of the quarter-wave line as an impedance inverter. If the discharge starts to arc, the discharge impedance decreases. At the input to the quarter-wave line, the impedance starts to increase. In general, this will cause less power to be delivered to the load which in turn interrupts the arc.

When the coax 90 is a half-wave line, the load line equation in this case is:

$$V_s = R_s I_d N + V_d/N$$

The effective source impedance is therefore:

$$(R_s)_{eff} = R_s N^2$$

Discharge stability is guaranteed by:

$$\partial V_d/\partial I_d + R_s N^2 > 0$$

Unlike the quarter-wave case, the effective source impedance is just that of the source and tends to be much smaller. For a 25 Ω source impedance and a 75 Ω cable, the effective source impedance (divided by $N^2$) is 225 Ω for a quarter-wave section and only 25 Ω for a half-wave. As shown in FIG. 11, applicants' configuration used for exciting RF lasers consisting of an RF generator, $V_s$, connected to a coax cable of length, l, and characteristic impedance, $Z_0$, in turn connected to the primary of the transformer T. The secondary of the transformer is connected to the discharge section in which the capacity $C_d$ is resonated out by a parallel coil $L_p$.

Also shown in FIG. 11, the impedance looking into the line is given by:

$$Z_{in} = Z_0 \frac{Z_1 + jZ_0 \tan kl}{jZ_1 \tan kl + Z_0}$$

where Z is the impedance looking into the transformer and kl is $2\pi/\lambda m$, (where $\lambda m$ is the wavelength).

The voltage, $V_{in}$, is given by:

$$V_{in} = V_s \frac{Z_{in}}{R_s + Z_{in}} = V^+ e^{jkl} - V^- e^{-jkl}$$

where $V^+$ and $V^-$ denote the forward and backward traveling wave, or solving for $V^+$:

$$V^+ = \frac{V_s \frac{Z_{in}}{R_s + Z_{in}}}{e^{jkl} - \frac{Z_1 - Z_0}{Z_1 + Z_0} e^{-jkl}}$$

The voltage at the input to the transformer is given by:

$$V_0 = V^+ - V^- = V^+ \left(1 - \frac{Z_1 - Z_0}{Z_1 + Z_0}\right)$$

To evaluate $Z_1$, it is easy to show that $Z_1$ is given by:

$$Z_1 = Q_u/[N^2(\omega C)]$$

where $Q_u$ is the unloaded Q and N is the turns ratio. In a typical example, where C=40 pf, f=40 MHz, and N=4, $Q_u \cong 100$;

$$Z_1 = 100/(16 \times 2 \times \pi \times 40 \times 10^{-12} \times 40 \times 10^6) \approx 600\Omega$$

Assuming $Z_1 >> Z_0$, then $$V_0 \approx 2 V^+$$

Considering the two specific cases of quarter-wave and half-wave lines, for the quarter-wave long line (i.e., l = λ/4)

$$Z_n = Z_0^2/Z_1 \tag{16}$$

$$V_{in} = V_s \frac{Z_0/Z_1}{R_s + \frac{Z_0^2/Z_1}{-2j\, Z_0/Z_1}} = \frac{jV_s}{2} \frac{Z_0}{R_s + Z_0^2/Z_1} \tag{17}$$

or $$V_{in} = j\frac{V_s}{2} \frac{Z_0}{R_s} \quad \text{for } R_s >> Z_0^2/Z_1 \tag{18}$$

The voltage developed across the discharge section is therefore:

$$V_d = V_s N^2 (Z_0 R_s) \tag{19}$$

For the half-wave long line (i.e., $1 = \lambda/2$)

$$Z_{in} = Z_0 \tag{20}$$

$$V^+ = \frac{V_s}{2} \frac{Z_{in}}{R_s + Z_{in}} \approx V_s/2$$

The voltage across the discharge section is therefore:

$$V_d = 2V^+ N^2 = N^2 V_s \tag{22}$$

Assuming a source impedance of 50Ω and a characteristic impedance of 50Ω, the two cases (λ/4 or λ/2 for line length) are equivalent. However, with the half-wave case, the voltage is independent (to first order) of either the source impedance or the cable impedance while with the quarter-wave case, a voltage step-up can be effected by using a cable impedance greater than the source impedance. For example, a 75 ohm line and a 50Ω source impedance will give a 50% increase in voltage.

Thus it is seen that by using a novel drive circuit consisting of a coaxial line, or other appropriate transmission path depending upon the frequency of operation, in which the line length is equal to one-quarter wavelength and the characteristic impedance is equal to or greater than 1.5 $R_s$, discharge stability is assured and there is a substantial increase in discharge voltage as compared to the source voltage.

FIG. 12 illustrates still an additional means by which the hot spot problem resulting from the bistable impedance characteristic of the laser discharge of either the transverse or longitudinal excitation configuration may be substantially reduced or eliminated. This additional means consists of a controlled application of power to the excitation electrodes as illustrated graphically in FIG. 12, namely, an almost instantaneous application of sufficient power to cause breakdown and then a more gradual increase in a power over a time period equal to or exceeding a minimum of 1 millisecond until maximum excitation power is achieved. By way of example, for the parameters indicated previously in the discussion of FIG. 11, $P_b$ is 20 watts and $P_{max}$ is 80 watts. It is believed that the improved stability resulting from the gradual application of excitation power, as illustrated in FIG. 12, is due to the tendency for the discharge to operate along its more stable impedance curve of the two positive slope curve portions or impedance that comprise the aforementioned bistable characteristic. Implementation of an automatic means for gradual application of excitation power may be readily accomplished by means of a suitable capacitive circuit at the RF voltage generator, which circuit is well known in the art and need not be described in detail herein.

FIG. 13 is a three dimensional view of a preferred embodiment of a longitudinal excitation waveguide 100 of the present invention in which waveguide bore 102 is formed by a pair of aluminum oxide side blocks 104 and 106, which are in turn sandwiched between two ceramic plates 108 and 110. Each such ceramic plate is coated along its outside surface, as shown in FIG. 13 for upper plate 108, by elongated electrodes as discussed previously and which are configured to provide a longitudinally directed electric field within the waveguide bore 102. More particularly, electrode 112 and its perpendicular portions such as portion 114, are, at any instant of time of opposite polarity with respect to the corresponding electrode 116 including its perpendicular portions such as portion 118.

In the preferred embodiment of FIG. 13, dimension "F" is typically 0.02 inches, dimension "G" is typically 0.04 inches, and dimension "H" is typically 0.25 inches. In addition, waveguide bore 102 is square in cross-section with walls 0.08 inch in length defining the chamber.

FIGS. 14 and 15 illustrate two alternative laser head configurations utilizing waveguide 100 of FIG. 13. As illustrated in FIG. 14, one such configuration consists of placement of laser waveguide 100 within a metal RF shielding can 120 of rectangular cross-section. The waveguide is centered therein by means of a pedestal 122. Pedestal 122 includes a chamber 124 of rectangular cross-section which serves as a gas reservoir for the waveguide structure. Chambers 102 of waveguide 100 and 124 of pedestal 122 are both at a suitable subatmospheric pressure for laser operation. The remaining interior volume of RF shielding can 120 is at ambient pressure and provides an enclosed channel for forced air cooling of waveguide 100.

In the alternative laser head configuration of FIG. 15 waveguide structure 100 is situated within the interior of a metal can suitable for providing RF shielding and for containing a substantial vacuum. The waveguide structure is mounted between ceramic blocks 132 and 134 which prevent discharge outside waveguide bore 102.

The remaining volume between the walls of RF can 130 and the waveguide structure, is also filled with a laser gas to serve as a reservoir, the gas being at the same subatmospheric pressure as the laser gas within waveguide bore 102.

FIG. 16 schematically represents the electrical system interface of a preferred embodiment of the present invention in which various means for reducing or eliminating the hot spot problems described previously are employed in the circuit. By way of example, waveguide 100 employs electrodes as illustrated in FIG. 13, that is, in the form of thin film metallization applied to the top and bottom surfaces respectively of ceramic plates 108 and 110. Spacing of the electrodes from the chamber by the plates 108 and 110, introduces the aforementioned ballasting capacitance. A resonant inductor $L_r$ is connected across the electrodes and the top and bottom electrode pairs of like polarity are interconnected by means of conductors 140 and 142, respectively, which also provide electrical interconnection to transformer 144. The transformer is connected to a suitable voltage source $V_s$ through the novel drive circuit consisting of a quarter-wavelength line 146 having a characteristic impedance equal to or greater than 1.5 times the source impedance. In FIG. 16 it is assumed that the source impedance is 50 Ohms and that the characteristic impedance of line 146 is equal to or greater than 75 Ohms in accordance with the novel improvement described above. In addition, the delayed excitation power characteristic, illustrated previously in conjunction with FIG. 12, is represented by inclusion in FIG. 16 of a suitable generator control device 148, the details of which will be known to those skilled in the art.

Figure 17:
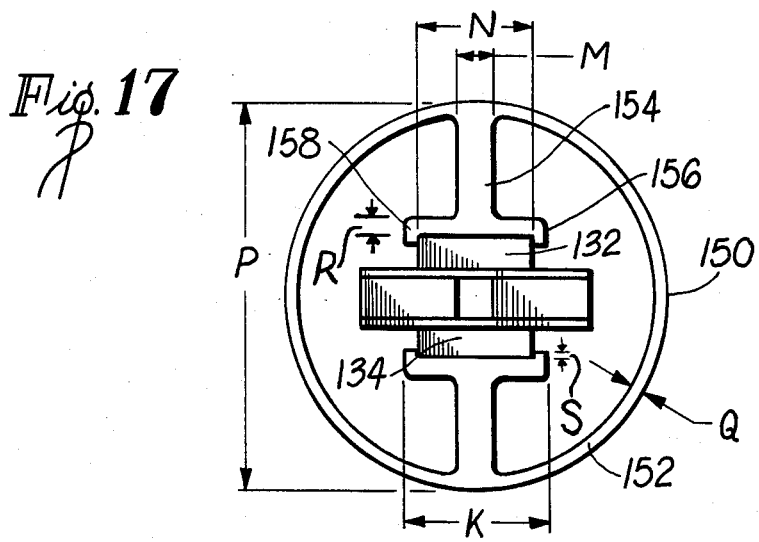
FIGS. 17, 18, and 19 illustrate an additional embodiment of a laser head configuration that employs an elastic metal tube designed to hold the waveguide laser in compressive aligned relation to its container.
Figure 18:
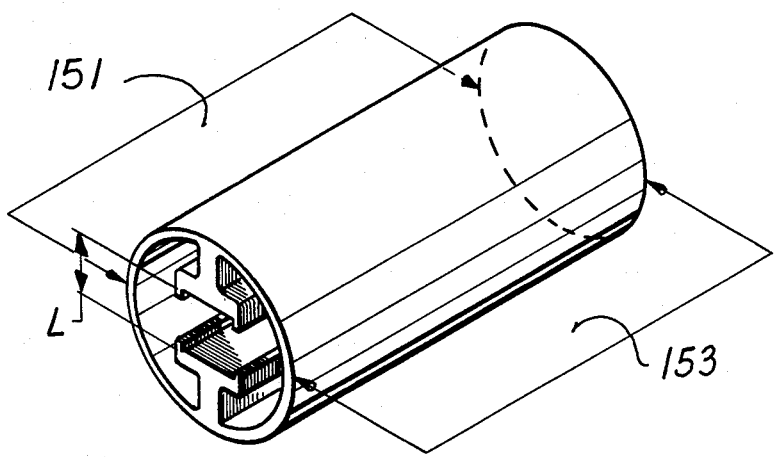
Figure 19:
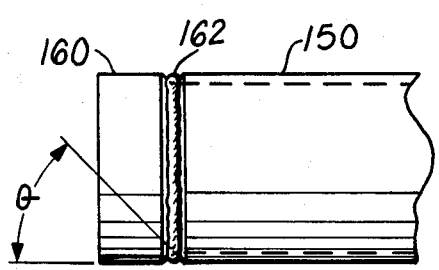

FIGS. 17, 18, and 19 illustrate still another embodiment of a laser head configuration that employs an improved construction technique that renders the present invention more conducive to lower cost mass production techniques. As in previously disclosed configurations, the laser bore or chamber is formed by opposing, spaced-apart aluminum electrodes sandwiched between two alumina blocks. The assembly is held in alignment and compression by an elastic tube 150 shown in cross-section in FIG. 17. The elastic tube serves as a spring-like evacuatable housing and heat sink that positions the waveguide and optical elements in proper alignment.

In the embodiment illustrated, elastic tube or cylinder 150 consists of a circular cylindrical tube having an outer shell 152 and a pair of spaced-apart parallel shelves 158 extending longitudinally and parallel to the axis of cylinder 150. Shelves 158 are extended along the length of tube 150 from opposing locations along the interior periphery of shell 152 by respective necks 154. Each such shelf 158 includes a pair of parallel, generally perpendicular walls 156 to form rectangular grooves suitable for receiving and aligning the alumina blocks 132 and 134 of the waveguide structure. Typical dimensions of one embodiment of the invention employing the elastic metal tube 150 which may be readily manufactured by extruding materials such as 6063-T5 aluminum and the like, may be defined by FIGS. 17 and 18 taken in conjunction with the followng table:

| REFERENCE DESIGNATION IN FIGS. 17 and 18 | TYPICAL DIMENSIONS (INCHES) |
|---|---|
| K | 0.475 ± .01 |
| L | 0.390 ± .01 |
| M | 0.125 ± .01 |
| N | 0.375 ± .01 |
| S | 0.025 ± .005 |
| P | 1.25 ± .01 |
| Q | 0.035 ± .005 |
| R | 0.125 ± .01 |

Typically, the distance between outside opposing surfaces of alumina blocks 132 and 134, is slightly larger than the pre-installation distance L. Accordingly, in order to insert the waveguide structure into the elastic tube 150, a compressive force is applied in planes 151 and 153 as indicated in FIG. 18 which causes the distance L between shelves 158 to increase to a distance suitable for receiving the waveguide structure. Thereafter, removal of the force applied in planes 151 and 153 results in a compressive force between the shelves applied through the waveguide structure in the range of 200 to 1000 psi. Consequently, it will be seen that shelves 158 provide compressive alignment of the alumina blocks 132 and 134 and the entire waveguide structure by the spring action provided by the novel tube 150. In addition to providing structural rigidity for the entire laser head configuration, tube 150 also provides substantial improved thermal contact with more efficient heat sinking action.

As shown in FIG. 19, the ends of tube 150 are chamfered at an angle $\theta$ preferably equal to about 45°. This results in the substantial advantage of providing automatic alignment for mirror mounts 160 which those skilled in the art will recognize as a distinct advantage to the configuration of the present invention in which mirrored end surfaces are sometimes desirable. With mirror mount 160 also chamfered as shown in FIG. 19, mount 160 is readily vacuum sealed to the end of tube 150 by means such as a continuous solder bead 162 which may be applied around the entire circumference of the interface between mirror mount 160 and tube 150.

It will now be understood that what has been disclosed herein is an improved waveguide gas laser of superior performance, efficiency, reliability and durability. One such improvement consists of longitudinal excitation of laser discharge within a suitable laser gas-containing waveguide chamber. Longitudinal excitation renders the spacing geometry of the electrodes variable independently of the waveguide chamber geometry resulting in increased performance efficiency. In addition, it will now be understood that a number of significant improvements have been disclosed each of which is designed to substantially reduce or eliminate hot spot problems that commonly occur in waveguide gas lasers of both transverse and longitudinal excitation configurations and which would otherwise substantially degrade the performance of the lasers. Such improvements, by way of example, consist of: Capacitive ballasting achieved through novel structural configurations including isolating the electrodes from the waveguide chamber by means of a suitable dielectric spacing medium such as ceramic or aluminum oxide; a novel drive circuit of pre-selected length and characteristic impedance; and a controlled application of excitation power over a minimum time period.

Still an additional novel improvement provided by means of the present invention consists of an elastic metal tube for housing the disclosed waveguide structures and utilizing spaced-apart parallel shelves formed within an extruded metal tube for compressively engaging and aligning the waveguide structure. Such a tubular housing serving as a spring-like vacuum container and heat sink that positions the waveguide and optical elements in proper alignment.

Although the present invention has been shown and described with reference to particular embodiments, as a result of applicants' teaching, various changes and modifications may now occur to persons skilled in the art to which the invention pertains. All such changes, including those made to the specific dimensions, materials and geometrical configurations illustrated and described herein without deviating from the spirit and contemplation of the invention, are within the scope thereof which is limited solely by the appended claims.

We claim:

1. In a waveguide laser structure of the type having means for defining an elongated chamber of a specified length and of cross-sectional dimensions suitable for guiding laser light and for generating therein a laser exciting discharge and an active laser gas disposed in said chamber, said laser gas having a laser transition capable of providing stimulated emission of quanta of light energy at a desired wavelength, wherein the improvement comprises:

means for establishing an alternating electric field in said chamber to establish the laser-exciting discharge in said laser gas; and an elongated generally cylindrical elastic metal tube housing of generally constant circular cross-sectional dimensions having a longitudinally extending axis therethrough and including a pair of elongated spaced-apart parallel shelves inwardly extending from diametrically opposed locations along interior portions of said tube along the length of said tube in a direction generally parallel to said longitudinal axis and wherein the inner distance between the spacing of such shelves is normally constant along said length but increases as opposed external forces are applied to the tube in a plane intermediate said shelves, wherein said shelves are configured and dimensioned to retain said means for defining an elongated chamber in compressive engagement along the entire chamber length absent such opposed forces.

* * * * *